(12) United States Patent
Leary

(10) Patent No.: US 8,989,511 B1
(45) Date of Patent: Mar. 24, 2015

(54) METHODS FOR CORRECTING FOR THERMAL DRIFT IN MICROSCOPY IMAGES

(75) Inventor: Sean P. Leary, Saraburi (TH)

(73) Assignee: Western Digital Technologies, Inc., Irvine, CA (US)

(*) Notice: Subject to any disclaimer, the term of this patent is extended or adjusted under 35 U.S.C. 154(b) by 263 days.

(21) Appl. No.: 13/537,007

(22) Filed: Jun. 28, 2012

(51) Int. Cl.
*G06K 9/42* (2006.01)

(52) U.S. Cl.
USPC .......................................................... 382/256

(58) Field of Classification Search
None
See application file for complete search history.

(56) References Cited

U.S. PATENT DOCUMENTS

| | | | |
|---|---|---|---|
| 5,753,814 A | 5/1998 | Han et al. | |
| 6,011,558 A * | 1/2000 | Hsieh et al. | 345/629 |
| 6,521,902 B1 | 2/2003 | Chang et al. | |
| 7,081,369 B2 | 7/2006 | Scott et al. | |
| 7,186,574 B2 | 3/2007 | Dulay et al. | |
| 7,208,965 B2 | 4/2007 | Zhang et al. | |
| 7,308,334 B2 | 12/2007 | Tasker et al. | |
| 7,372,016 B1 | 5/2008 | Tortonese et al. | |
| 7,406,860 B2 | 8/2008 | Zhou et al. | |
| 7,664,566 B2 | 2/2010 | Tasker et al. | |
| 7,703,314 B2 | 4/2010 | Abe et al. | |
| 8,094,925 B2 | 1/2012 | Schneidewind et al. | |
| 8,095,231 B2 | 1/2012 | Tasker et al. | |
| 8,097,846 B1 | 1/2012 | Anguelouch et al. | |
| 8,214,918 B2 | 7/2012 | Amos et al. | |
| 8,490,211 B1 | 7/2013 | Leary | |
| 2003/0031385 A1 * | 2/2003 | Elad et al. | 382/300 |
| 2003/0093894 A1 | 5/2003 | Dugas et al. | |
| 2005/0213807 A1 * | 9/2005 | Wasserman | 382/152 |
| 2006/0023937 A1 * | 2/2006 | Tessadro | 382/152 |
| 2006/0073618 A1 | 4/2006 | Dulay et al. | |
| 2006/0286772 A1 | 12/2006 | Pearl | |
| 2007/0251306 A1 | 11/2007 | Zhou et al. | |
| 2011/0091095 A1 | 4/2011 | Yin | |

(Continued)

FOREIGN PATENT DOCUMENTS

| | | |
|---|---|---|
| JP | 11-258129 A | 9/1999 |
| JP | 2005-265424 A | 9/2005 |

(Continued)

OTHER PUBLICATIONS

Meyer, T., Farnham, R., and Huynh, N., Fast Atomic Force Microscopy Imaging using Self-Intersecting Scans and Inpainting, Aug. 5, 2011, UCLA Project Report, pp. 1-15.*

(Continued)

*Primary Examiner* — Stephen R Koziol
*Assistant Examiner* — Jonathan S Lee

(57) ABSTRACT

Methods for correcting for thermal drift in microscopy images are described. One such method includes receiving an original image for correction, the original image having been generated using microscopy, receiving information indicative of a feature selected from within the original image by a user, the selected feature including an edge, storing the original image in a database including a plurality of images, each having one or more features, correlating the selected feature with one of the one or more features stored in the database to identify a first plurality of points defining the edge, removing one or more points of the first plurality of points using an outlier rejection technique, generating a smoothing spline approximation for a second plurality of points defining the edge, and generating a corrected image by shifting points of the original image in accordance with the smoothing spline approximation.

11 Claims, 3 Drawing Sheets

(56) References Cited

U.S. PATENT DOCUMENTS

2011/0138505 A1    6/2011    Zhou et al.
2013/0254948 A1*   9/2013    Hartong et al. .................. 850/1

FOREIGN PATENT DOCUMENTS

| WO | WO2005050691 A2 | 6/2005 |
| WO | WO2005050691 A3 | 6/2006 |
| WO | WO2008111365 A1 | 9/2008 |

OTHER PUBLICATIONS

Kienberger, F., Pastushenko, V.P., Kada, G., Puntheeranurak, T., Chtcheglova, L., Riethmueller, C., Rankl, C., Ebner, A., and Hinterdorfer, P., Improving the contrast of topographical AFM images by a simple averaging filter, 2006, Ultramicroscopy, vol. 106, pp. 822-828.*

Marinello, F., Bariani, P., De Chiffre, L., and Savio, E., Fast technique for AFM vertical drift compensation, 2007, Meas. Sci. Technol., vol. 18, pp. 689-696.*

Lu, W., Li, Z., Hatakeyama, K., Egawa, G., Yoshimura, S., and Saito, H., High resolution magnetic imaging of perpendicular magnetic recording head using frequency-modulated magnetic force microscopy with a hard magnetic tip, 2010, Applied Physics Letters, vol. 96, pp. 1-3.*

Lapshin, R., "Automatic drift elimination in probe microscope images based on techniques of counter-scanning and topography feature recognition", Measurement Science and Technology, 2007, pp. 907-927, vol. 18, Institute of Physics Publishing.

Park Systems Brochure—Programmable Data Density (PDD) for High Throughput Feature Measurement; accessed from www.parkafm.com on: Jan. 26, 2012; 2 pages.

* cited by examiner

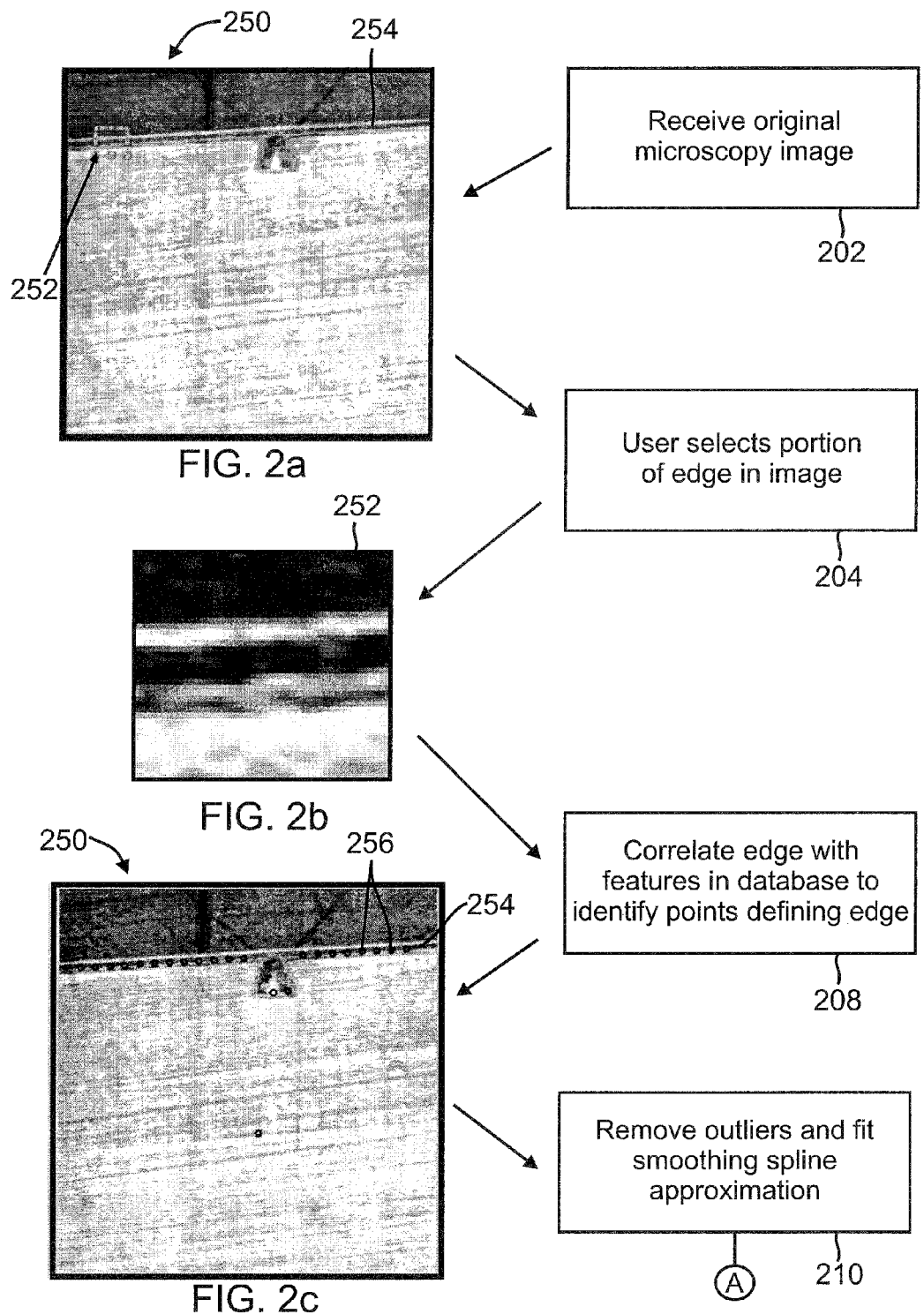

Perform two dimensional de-trending by shifting points of original image to level the edge defined by smoothing spline approximation

214

METHODS FOR CORRECTING FOR THERMAL DRIFT IN MICROSCOPY IMAGES

FIELD

The present invention relates generally to processes for manufacturing magnetic components for disk drives, and more specifically, to methods for correcting for thermal drift in microscopy images obtained during such manufacturing.

BACKGROUND

Thermal drift distortions in high-resolution raster scanning microscopy are widely observed and reported in the literature. Artifacts due to the thermal drifting are often present in these types of scans and caused by temperature gradients/changes which induce deformations via the thermal expansion coefficients. Temperature changes/gradients can be caused by opening/closing of the microscopy tool enclosure and electronic/mechanical heating of associated motors. These artifacts complicate the both the qualitative and quantitative analysis of the scans.

The known methods for reducing these undesirable artifacts involve burdensome changes to the measurement hardware or time consuming manual modification of the collected image. Another method known in the art involves use of automatic drift elimination in probe microscope images based on techniques of counter-scanning and topography feature recognition as described in an article by R. V. Lapshin, Measurement Science and Technology, vol. 18, issue 3, pages 907-927, March 2007. However, this method generally requires multiple scans to be performed in opposite directions. Each of these required scans are expensive and time consuming to perform. As such, a method for correcting for thermal drift that addresses these shortcomings is needed.

SUMMARY

Aspects of the invention relate to methods for correcting for thermal drift in microscopy images. In one embodiment, the invention relates to a method for correcting for thermal drift in microscopy images, the method including receiving an original image for correction, the original image having been generated using microscopy, receiving information indicative of a feature selected from within the original image by a user, the selected feature including an edge, storing the original image in a database including a plurality of images, each having one or more features, correlating the selected feature with one of the one or more features stored in the database to identify a first plurality of points defining the edge, removing one or more points of the first plurality of points using an outlier rejection technique, generating a smoothing spline approximation for a second plurality of points defining the edge, and generating a corrected image by shifting points of the original image in accordance with the smoothing spline approximation.

BRIEF DESCRIPTION OF THE DRAWINGS

FIGS. 2a to 2e illustrate a sequence of views of a microscopy image and corresponding processing actions performed on the microscopy image in a process for correcting for thermal drift in the microscopy image in accordance with one embodiment of the invention.

DETAILED DESCRIPTION

Figure 1:
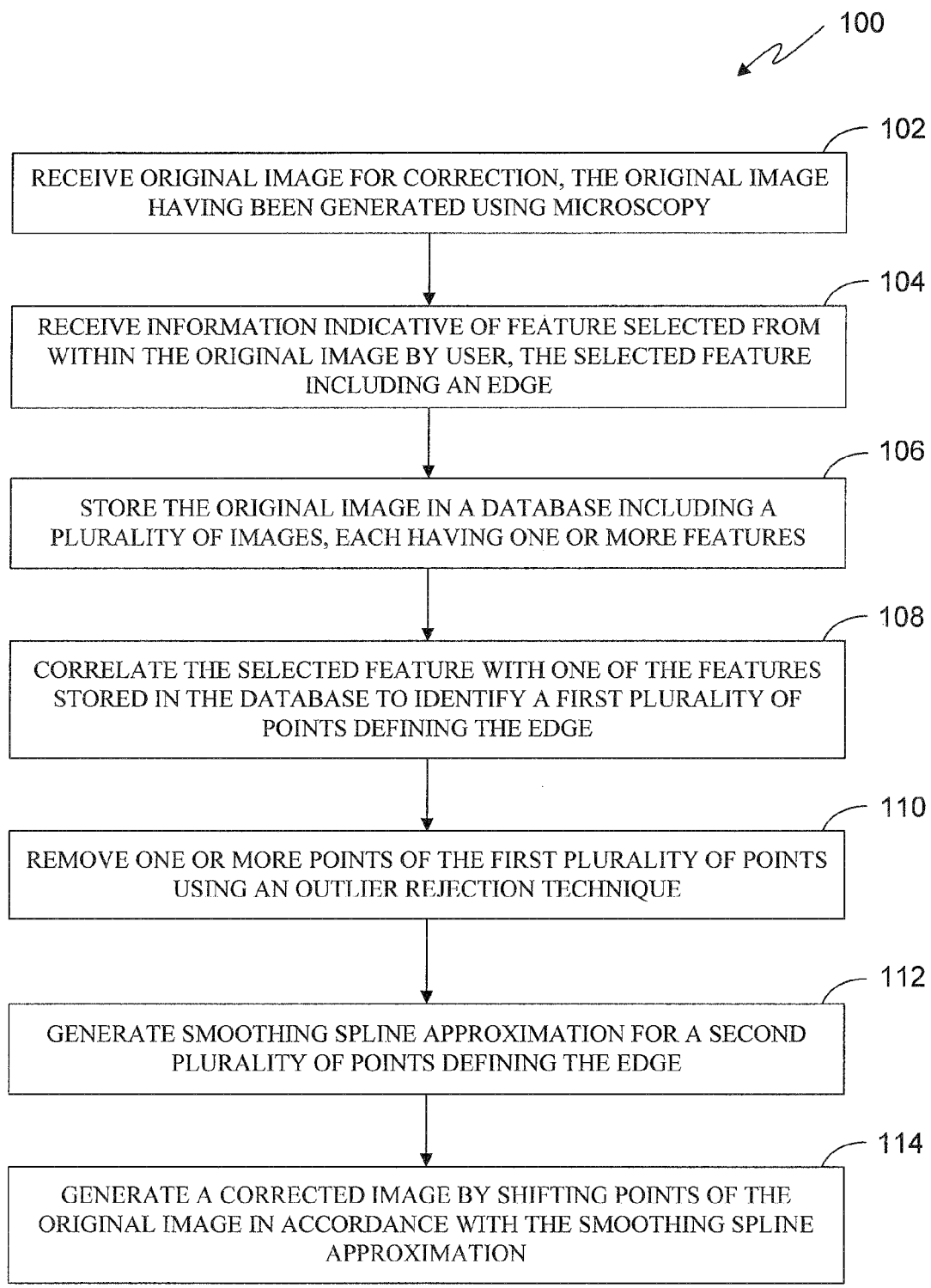
FIG. 1 is a flowchart of a process for correcting for thermal drift in microscopy images in accordance with one embodiment of the invention.

Referring now to the drawings, embodiments of processes for correcting for thermal drift in microscopy images are illustrated. The thermal drift correction processes receive an original microscopy image, allow a user to select a feature in the image including an edge, correlate the selected feature with a feature stored in a database of features to identify points defining the edge, remove one or more of the points using an outlier rejection technique, generate a smoothing spline approximation of points defining the edge, and generate a corrected image by shifting points of the original image in accordance with the smoothing spline approximation such that the edge is made substantially level in the corrected image. As a result, the process substantially removes the effects of thermal drift from the original image, and the corrected image can be used to measure specific dimensions of interest within the original image such as a thickness measured relative to the edge. These measurements can be very helpful in the analysis and manufacture of reader and writer components of magnetic heads used in storage drives.

FIG. 1 is a flowchart of a process 100 for correcting for thermal drift in microscopy images in accordance with one embodiment of the invention. The process first receives (102) an original image for correction, the original image having been generated using microscopy. The process then receives (104) information indicative of a feature selected from within the original image by a user, the selected feature including an edge. In several embodiments, the process provides a graphical user interface (GUI) depicting the original image and allowing the user to select a portion of the original image, where the portion or selected feature should include a portion of an edge contained in the original image.

The process stores (106) the original image in a database including a plurality of images, each having one or more features. In one embodiment, this action is optional and a separate process may be responsible for populating the database. The process then correlates (108) the selected feature with one of the features stored in the database to identify a first plurality of points defining the edge. The process removes (110) one or more points of the first plurality of points using an outlier rejection technique. In one embodiment, this action is optional as the outliers are not substantial or a separate process is responsible removing outliers. The process then generates (112) a smoothing spline approximation for a second plurality of points defining the edge. The process generates (114) a corrected image by shifting points of the original image in accordance with the smoothing spline approximation.

In several embodiments, the process is implemented using a program written in MATLAB or on another suitable platform for performing relatively complex mathematic computations involving vectors and matrices. In a number of embodiments, the program can run on a general purpose computer employing an operating system known in the art or one yet to be developed.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 2D:
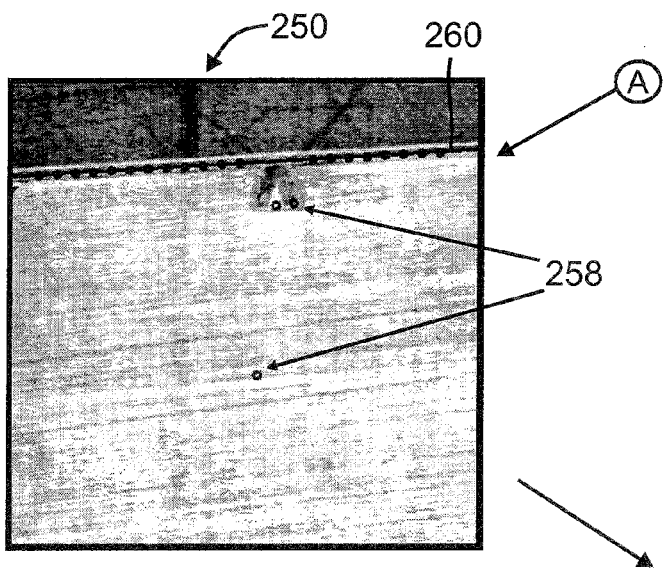

FIGS. 2a to 2e illustrate a sequence of views of a microscopy image and corresponding processing actions performed on the microscopy image in a process for correcting for the thermal drift in the microscopy image in accordance with one embodiment of the invention. In FIG. 2a, the process first receives (202) an original image 250 for correction, the original image 250 having been generated using microscopy. In one embodiment, the original image is generated using transmission electron microscopy, atomic force microscopy, or other microscopy techniques/tools known in the art. The process then provides a graphical user interface (GUI) depicting the original image 250 and allows the user to select (204) a portion 252 of the original image, where the user is instructed that the portion or selected feature 252 should include a portion of an edge 254 contained in the original image 250. In FIG. 2b, the process receives (204) information indicative of the selected feature 252.

In several embodiments, the process can store the original image 250 in a database including a plurality of images, each including one or more features. In FIG. 2c, the process then correlates (208) the selected feature 252 with one of the features stored in the database to identify a first plurality of points defining the edge. In several embodiments, the process performs a normalized cross-correlation between the selected feature 252 and the stored database features to generate a two-dimensional correlation matrix where the maximum points in the matrix identify the points 256 defining the edge 254 (e.g., coordinates of pixels within the original image 250).

In FIG. 2d, the process removes (210) one or more points 258 of the first plurality of points using an outlier rejection technique and then generates (210) a smoothing spline approximation 260 for a second plurality of points defining the edge. In one embodiment, the outlier rejection technique can be an interquartile range technique, a Gaussian distribution technique or other suitable outlier rejection technique known in the art for removing outliers. In several embodiments, the smoothing spline approximation can vary by frequency. In such case, the smoothing spline approximation can be generated using a filter having a selectable wavelength, where the filter or wavelength is chosen based on the size of the original image and an expected frequency of the thermal drift component.

Figure 2E:
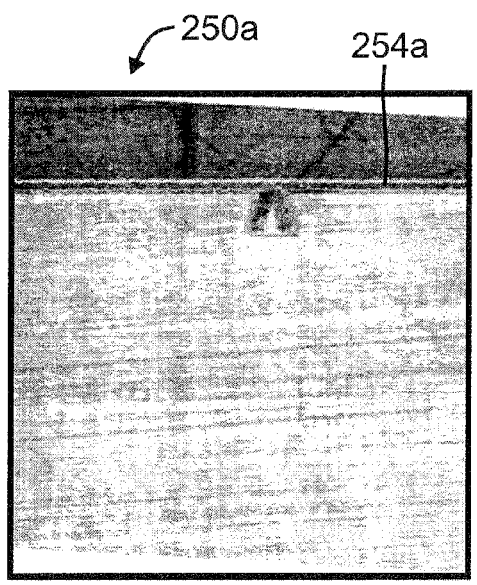

In FIG. 2e, the process performs (214) two dimensional de-trending by shifting points of the original image to substantially level the edge defined by the smoothing spline approximation, thereby generating a corrected image 250a where the edge 254a has been leveled (e.g., with respect to the bottom or top border of the original image). In several embodiments, the de-trending effectively involves subtracting the smoothing spline approximation (e.g., one dimensional smoothing spline) from the original image, or more specifically, quantifying the deviation for each pixel along the edge from the level position of the edge, and then subtracting the quantified deviation for each pixel above and below the edge pixel in the original image. In several embodiments, the de-trending can be performed using the following script:

```
j2=abs (yi−max(yi));
  [m,n]=size (Image);
  for j=1:m;
    for i=1:n;
      ImageCorrected (j+j2(i), i)=Image (j,i);
    end
  end
``` where the original image is represented by the matrix variable Image (j,i), the fitted values for the smoothing spline approximation for each coordinate are xi and yi, and j2 is a vector representing the quantified vertical deviation from level for each respective xi position on the spline. When the script terminates, the ImageCorrected matrix contains the original image after the thermal drift has been corrected (see FIG. 2e). In several embodiments, the process and script effectively shift each pixel in the original image. In one embodiment, the process and script can be performed in MATLAB or on another suitable platform for performing relatively complex mathematic computations involving vectors and matrices. In several embodiments, any number of suitable programming languages can be used to implement the process and script.

The process can be used in conjunction with various transmission electron microscope (TEM) images, atomic force microscopy (AFM) images, or any other microscopy images. In effect, the process can allow thickness of a component in the image to be determined easily by removing trends due to tilt (e.g., x-y rotation) and/or thermal drift. In several embodiments, for example, the corrected image can be used to measure specific dimensions of interest within the original image such as a thickness measured relative to the edge and/or a border of the original image. This can be very helpful in the analysis and manufacture of reader and writer components of magnetic heads used in storage drives. In several embodiments, for example, the original image includes a portion of a writing pole for a magnetic writing head, and the thickness of a layer of the writing pole can be easily measured once the thermal drift has been corrected in the original image. The process also aids in visualization when comparing images with different levels in drift.

The conventional solutions to this problem involve overly burdensome wait times for a thermal equilibrium to be established in the TEM tool generating microscopy images. However, in certain laboratory settings, such as one in which the environment is not controlled strictly enough, the thermal equilibrium may never be established. In the case of atomic force microscope type measurements, for example, a typical scan time can be on the order of 10 minutes per head at a cost of about $5 per scan. In the case of TEM type measurements, for example, the scan time can be on the order of tens of minutes and the cost per sample is on the order of about $800. As such, this process provides an important financial benefit/advantage due to very fast offline processing which circumvents the need to wait long times for equilibrium or to rescan sample with excessive thermal drift character as compared to conventional thermal drift correction processes.

In one embodiment, the process of FIGS. 2a to 2e can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for correcting for thermal drift in microscopy images, the method comprising:
   receiving an original image for correction, the original image having been generated using microscopy;
   receiving information indicative of a feature selected from within the original image by a user, the selected feature comprising an edge;
   storing the original image in a database comprising a plurality of images, each comprising one or more features;
   correlating the selected feature with one of the one or more features stored in the database to identify a first plurality of points defining the edge;

removing one or more points of the first plurality of points using an outlier rejection technique;

generating a smoothing spline approximation for a second plurality of points defining the edge; and generating a corrected image by performing a two dimensional de-trending that shifts points of the original image in accordance with the smoothing spline approximation.

2. The method of claim 1, wherein the generating the corrected image by performing the two dimensional de-trending that shifts points of the original image in accordance with the smoothing spline approximation comprises subtracting the smoothing spline approximation from the original image.

3. The method of claim 2, wherein the subtracting the smoothing spline approximation from the original image has an effect of leveling the selected edge with respect to a border of the corrected image.

4. The method of claim 1, wherein the receiving information indicative of the feature selected from within the original image by the user comprises providing a graphical user interface displaying the original image and allowing the user to select a portion of the selected edge.

5. The method of claim 1, wherein the correlating the feature with the one of the one or more features stored in the database to identify the first plurality of points defining the edge comprises using a normalized cross-correlation technique.

6. The method of claim 5, wherein the using the normalized cross-correlation technique comprises generating a correlation matrix identifying the first plurality of points defining the edge.

7. The method of claim 1, wherein the outlier rejection technique comprises a technique selected from the group consisting of an interquartile range technique and a Gaussian distribution technique.

8. The method of claim 1, further comprising measuring a thickness of a component within the corrected image.

9. The method of claim 8, wherein the original image comprises a portion of a writing pole for a magnetic writing head.

10. The method of claim 9, wherein the measured component is a layer of the writing pole.

11. The method of claim 1, wherein the generating the corrected image by performing the two dimensional de-trending that shifts points of the original image in accordance with the smoothing spline approximation comprises shifting each pixel of the original image in accordance with the smoothing spline approximation.

\* \* \* \* \*